United States Patent Office 3,056,796
Patented Oct. 2, 1962

3,056,796
2.8-DIAZASPIRO(4.5)DECANE-1.3 DIONES
Ernst Jucker, Binningen, Basel-Land, and Rudolf Süess, Rheinfelden, Switzerland, assignors to Sandoz Ltd., Basel, Switzerland, a Swiss firm
No Drawing. Filed Mar. 14, 1960, Ser. No. 14,556
Claims priority, application Switzerland Mar. 25, 1959
13 Claims. (Cl. 260—294)

The present invention relates to novel substituted succinimides, their salts and to processes for their production.

To facilitate an understanding of the new compounds and the novel methods for preparing the new compounds of the invention the attached reaction scheme illustrates in Fig. 1 the structure of the novel end product of the invention, produced by steps illustrated in Figs. 2–7, inclusive. By reaction of reactant A, a substituted piperidone-4, shown in Fig. 2 with reactant B, the active methylene compound of Fig. 3 there is formed the piperidylidene-4 intermediate compound shown in Fig. 4 as the main intermediate I. This intermediate I of Fig. 4 is reacted by addition of HCN to form the intermediate addition compound II thereof shown in Fig. 5 which is converted to intermediate III, Fig. 6 through hydrolysis, decarboxylation and esterification. Then the intermediate III is cyclized to the final product shown in Fig. 1 by reaction with an amine shown in Fig. 7.

The present invention provides, as new compounds, substituted succinimides having the general Formula I (as shown in Fig. 1 of the accompanying reaction scheme)

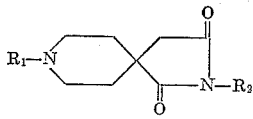

in which $R_1$ is selected from the group consisting of hydrogen, lower alkyl and benzyl and $R_2$ is selected from the group consisting of hydrogen and lower alkyl. The present invention also provides the addition salts with acids of the said succinimide derivatives and a process for making said acid addition salts by reacting the succinimide base with a pharmacologically acceptable inorganic or organic acid; examples of pharmacologically acceptable acids for making the addition salts including hydrochloric acid, hydrobromic acid, sulphur acid, citraconic acid, phosphoric acid, benzoic acid, hexahydrobenzoic acid, methanesulphonic acid, benzene sulphonic acid, oxalic acid, tartaric acid, succinic acid, maleic acid, fumaric acid, acetic acid, mandelic acid, nicotinic acid, levulinic acid, stearic acid, myristic acid, palmitic acid, citric acid, isocitric acid, glutaric acid, malic acid, pimelic acid, lactic acid and the like.

METHOD OF PREPARATION

Referring to this reaction scheme the present invention also provides a process for the production of said substituted succinimides of the general formula as above mentioned, characterized in that a substituted piperidone-4 of the general formula (as shown in Fig. 2 of the accompanying diagrammatic reaction scheme)

in which $R_1'$ designates a lower alkyl group or a benzyl group, is reacted with a compound of the general formula (as shown in Fig. 3 of the accompanying diagrammatic reaction scheme)

$$H_{2x}C\text{---}COO\text{-Alkyl}$$

in which X designates a cyano group or a —COO-Alkyl group, in the presence of a catalyst for splitting off water to give a piperidylidene-4 derivative of the general formula (as shown in Fig. 4 of the accompanying diagrammatic reaction scheme)

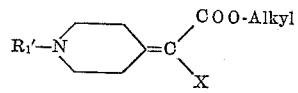

the last mentioned material is then converted into a compound of the general formula (as shown in Fig. 5 of the accompanying diagrammatic reaction scheme)

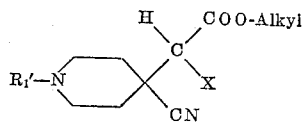

by the incorporation of the elements of hydrocyanic acid and the resulting material is converted into a substituted succinic acid diester of the general formula (as shown in Fig. 6 of the accompanying diagrammatic reaction scheme)

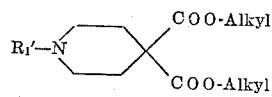

by the steps of hydrolysis, decarboxylation and esterification with an alkanol, the last mentioned diester is reacted with a nitrogenous compound of the general formula (as shown in Fig. 7 of the accompanying diagrammatic reaction scheme)

and, when $R_1'$ designates a benzyl group, the benzyl group may be split off, if desired, under reducing conditions, to produce a compound of the general formula as shown in Fig. 1 wherein $R_1$ designates a hydrogen atom, the secondary amino group at the piperidine moiety of said compound being then alkylated, if desired, by means of an alkylating agent.

When it is desired to produce an end product of the general formula as shown in Fig. 1 of the accompanying diagrammatic reaction scheme wherein $R_2$ denotes a hydrogen atom, the general method of preparation achieves this object by cyclization of a diester of the general formula as shown in Fig. 7 with a nitrogenous compound of the formula $R_2$—$NH_2$ wherein $R_2$ designates a hydrogen atom, i.e. with ammonia. But for producing said compounds, the present invention also provides a modification of the above process, characterized in that the compound of the general formula as shown in Fig. 5 of the accompanying diagrammatic reaction scheme

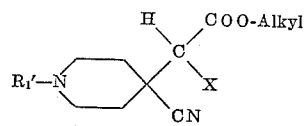

is subjected to partial hydrolysis, decarboxylation, esterification with an alkanol and ring closure, without involving the above mentioned cyclization with ammonia. Said ring closure may be effected by heating the esterification product above its melting point until bubbling ceases. It is likewise possible to achieve ring closure by dissolving and heating the esterification product in an organic inert solvent, for example benzene, toluene or xylene. In the modification of the process of the invention, when the compound of the general formula as shown in Fig. 5 of the accompanying diagrammatic reaction scheme

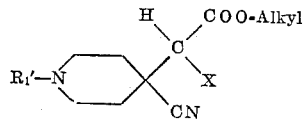

has been subjected to partial hydrolysis, the esterification with an alkanol affords a succinic acid monester monoamide as an intermediate product. However, in effecting ring closure it is not necessary to pass through the last mentioned intermediate and it is also possible to cyclize the compound having the general formula as shown in Fig. 5 of the accompanying diagrammatic reaction scheme directly, for example, by treatment with a mixture of concentrated sulphuric acid and glacial acetic acid.

The production of the succinimides which are devoid of substituents on the piperidine nitrogen atom (see formula shown in Fig. 1 wherein $R_1$=hydrogen) is advantageously effected by means of (1-benzyl-piperidyl-4) compounds with subsequent reductive splitting off of the benzyl group. Catalytic debenzylation may taken place, for example, with hydrogen on a palladium catalyst and the reductive splitting with noble metal catalyst and hydrogen may be effected with the salts as well as the free bases. The succinimide derivative may then be alkylated at the piperidine nitrogen atom, for example, by treating it with an aliphatic aldehyde or ketone containing 6 or less carbon atoms in an atmosphere of hydrogen in the presence of a conventional hydrogenation catalyst such as Raney nickel, platinum or palladium catalyst, or by reacting it with an alkyl halide, preferably in the presence of an alkaline condensing agent (for example, sodium carbonate), or by methylating with formaldehyde and formic acid.

The compounds of the invention may be produced, for example, as follows:

A 1-alkyl-piperidone-4 in an inert organic solvent, for example, benzene, toluene, xylene, tetralin, is reacted with a compound of the general formula as shown in Fig. 3 of the accompanying reaction scheme, preferably with a cyanacetic acid alkyl ester in the presence of a catalyst favoring the splitting off of water (for example, pyridine, or glacial acetic acid alone or together with ammonium acetate or acetamide) while using means for continuously removing water, to give a compound of the general formula as shown in Fig. 4 of the accompanying reaction scheme. The elements of hydrocyanic acid are added at the double bond of the last mentioned compound and the resulting compound of the general formula as shown in Fig. 5 of the accompanying reaction scheme is saponified with concentrated hydrochloric acid to give a substituted succinic acid which is decarboxylated. The resulting material is esterified to give a substituted succinic acid diester of the general formual as shown in Fig. 6 of the accompanying reaction scheme by means of hydrogen chloride and an absolute alkanol. Suitably the process up to the production of the diester of the formula as shown in Fig. 6 of the accompanying reaction scheme is effected without isolation or purification of the various intermediate products.

The substituted succinic acid diester of the general formula as shown in Fig. 6 of the accompanying reaction scheme may be converted into the required substituted succinimide of the general formula as shown in Fig. 1 of the accompanying reaction scheme by reaction with concentrated aqueous ammonia or a primary alkylamine (for example, liquid methylamine, ethylamine), preferably in a closed vessel; the reaction mixture is heated to an elevated temperature, for example, 180 to 250° C., whereby ring closure is effected.

The substituted succinimides of the general formula as shown in Fig. 1 of the accompanying reaction scheme, at room temperature, are colorless oils or crystalline substances. They are easily soluble in the common organic solvents but are not soluble in water. As already indicated above, they form, at room temperature, crystalline salts with inorganic or organic acids; most of said salts are water soluble.

PHARMACOLOGICAL EFFECT OF THE COMPOUND OF THE INVENTION

The compounds of the present invention have therapentically useful pharmacodynamic properties and are also useful as intermediate products for the production of pharmaceuticals.

Some of the compounds have an effect of the cholinergic type. For example, 2.8-dimethyl-2.8-diazaspiro (4.5) decane - 1.3 - dione and 2 - ethyl - 8 - methyl - 2.8- diazaspiro (4.5) decane-1.3-dione are characterized by a a parasympathicomimetic effect being manifested peripherally and centrally. Said two compounds have a blood pressure lowering and pulse rate diminishing effect in animals while simultaneously, the motility of the small intestine and the bladder is increased and the flow of saliva and secretion of stomach juice is strongly favored. In animals, the central cholinergic effect are evidenced by a strong potentiation of narcosis, a distinct analgetic effect and also an inhibition of conditioned reflexes. These effects are seen to be of parasympathicomimetic origin since both the central and peripheral effects are reduced or removed by the administration of high amounts of hyoscyamine and other equivalent centrally acting anticholinergic agents.

Owing to their stimulating effects upon stomach, intestinal and bladder motility, the said compounds are intended for the treatment of atonic conditions of the digestive canal and the bladder due to various causes, as well as for the treatment of a condition of insufficient gastric juice secretion. Due to their properties of reducing the pulse rate these compounds are also suitable for treating paroxysmal tachycardia. Furthermore, these compounds may be used in order to produce a tranquilizing effect and thus are generally useful for treatment of various mental diseases as well as for pain.

The preparation of the novel compounds and the novel intermediate chemical compounds obtained in the process by which they are secured are illustrated by the following specific examples. The examples are given for illustration and not by way of limitation. All of the temperature values given in the following examples are in degrees centigrade. The melting and boiling points are corrected.

EXAMPLE 1

*8-Methyl-2.8-Diazaspiro(4.5)Decane-1.3-Dione*

(A) ETHYL ESTER OF (1-METHYL-PIPERIDYLIDENE-4)- CYANACETIC ACID 113.0 g. of cyanacetic acid ethyl ester, 113.0 g. of 1-methyl-piperidone-4 and 23 cc. of glacial acetic acid in 250 cc. of benzene are mixed and heated at the boiling point for 4 hours. Water which forms continuously during the reaction, is removed from the refluxing material in a continuous manner. After 2 and a half hours the amount of water formed amounts to 18 cc. After refluxing for an additional one and a half hours, 300 cc. of benzene are added and the mixture is shaken with 150 cc. of ice-cold saturated potassium carbonate solution. The potassium carbonate solution is extracted with a total of 150 cc. of benzene and the benzene extracts are washed with 50 cc. of water. After combining the benzene extracts and drying over sodium sulphate, the united benzene extracts are evaporated and the dark colored residue in the vessel is carefully distilled to prevent overheating in a high vacuum. Even slight overheating, for example, on distilling, causes considerable decomposition. Pure (1-methyl - piperidylidene-4)-cyanacetic acid ethyl ester is a colorless, viscous oil having a boiling point of 114–115°/0.05 mm. of Hg;

$$n_D{}^{21.5}=1.4952$$

The hydrochloride of the base consists of fine needles having a melting point of 182–183° (decomposition) after recrystallization from ethanol.

(B) [(1-METHYL-4-CARBETHOXY-PIPERIDYL)-4]- ACETIC ACID ETHYL ESTER 87.3 g. of the material produced as at (A) above and 42.5 g. of potassium cyanide are heated in 130 cc. of 50% aqueous ethanol on a water bath. After 10 minutes a further 15 cc. of water are added and the material is left for a further 5 minutes heating on the water bath. The resulting solution which is then clear and orange colored, is cooled to room temperature and, while cooling with ice, 80 cc. of concentrated hydrochloric acid solution are added. The solution is evaporated to dryness under reduced pressure by a water pump at a temperature of 60°, the residue is taken up in 150 cc. of water and the aqueous solution is saturated with hydrochloric acid gas while cooling with ice. Boiling at reflux for 20 hours is effected and the material is again evaporated to dryness. The resulting colorless, crystalline residue is dried over phosphorus pentoxide for 60 hours, suspended in 500 cc. of ethanol which had previously been dried over calcium oxide, the suspension is saturated with dry hydrogen chloride gas while cooling with ice and boiled at reflux for 15 hours. Subsequently the material is reduced to one quarter of its original volume in a atmosphere of nitrogen at the pump and at a temperature of 60°, twice the volume of water is added while cooling well, saturation with potassium carbonate is effected and extraction three times, each time with 250 cc. of chloroform is carried out. The chloroform extracts are washed once with water and dried over sodium sulphate. After evaporation of the chloroform distillation of the oily residue is effected in a high vacuum. Pure [(1-methyl-4-carbethoxy-piperidyl)-4]-acetic acid ethyl ester is obtained in the form of a colorless gas having a boiling point of 95–96°/0.06 mm. of Hg; $n_D^{20.5}=1.4582$. The picrate of the base forms canary yellow needles on recrystallization from ethanol and has a melting point of 135–136°.

(C) 8-METHYL-2.8-DIAZASPIRO(4.5)DECANE-1.3-DIONE 6.6 g. of the product produced at (B) above are boiled at reflux for 46 hours together with 50 cc. of concentrated aqueous ammonia. After 5 hours the initially undissolved ester has become completely dissolved. The slightly yellow colored reaction solution is evaporated to dryness at the pump at a temperature of 60°. Subsequently the crystalline residue is heated for 3 hours to 200°, the material is then taken up in water and filtered through cotton wool. The filtrate is evaporated to dryness and the residue dissolved in methanol. Dry hydrogen bromide gas is passed through the solution, whereby the hydrobromide of the required 8-methyl-2.8-diazaspiro(4.5)decane-1.3-dione is precipitated in the form of colorless little plates. After recrystallization from methanol the slightly hygroscopic hydrobromide melts at 311–313° (decomposition).

EXAMPLE 2

2.8-Dimethyl-2.8-Diazaspiro(4.5)Decane-1.3-Dione

Using the method stated at Example 1(A), (1-methyl piperylidene-4)-cyanacetic acid ethyl ester is first produced and converted as stated in Example 1(B) into [(1-methyl-4-carbethoxy-piperidyl)-4]-acetic acid ethyl ester. 59.5 g. of the last mentioned material are heated in an excess of liquid 100% methylamine for 12 hours in a pressure vessel to 140°. Subsequently cooling is effected and the excess of methylamine is allowed to evaporate. The crystalline residue is heated to 185°, whereby methylamine is split off while melting. After 2 and a half hours the evolution of methylamine is complete. On cooling, the residue crystallizes; it is taken up in 2 N hydrochloric acid solution, extracted with ether and the hydrochloric acid solution is made alkaline by the addition of solid potassium carbonate. The resulting precipitate is extracted with methylene chloride, the extract is washed once with water and dried over sodium sulphate. After evaporation of the solvent, there remains a colorless, crystalline residue consisting of 2.8-dimethyl-2.8-diazaspiro(4.5)decane-1.3-dione. The last mentioned compound is easily sublimed; temperature of sublimation 80°/0.01 mm. of Hg, melting point 94–96°.

The hydrochloride of the base which is produced in ethanol, is recrystallized from methanol; it is slightly hygroscopic in the form of colorless prisms having a melting point of 318–319° (decomposition).

In order to produce the fumarate, equivalent amounts of the free base and fumaric acid (1 mol:1 mol) are boiled together in ethanol. After cooling filtering is effected and the material is recrystallized from methanol/water. The fumarate is present in the form of colorless polyhedric crystals having a melting point of 266° (decomposition).

The picrate of the free base is produced by boiling it together with an excess of ethanolic picric acid solution for a short time. After cooling, the picrate crystallizes out in the form of fine yellow prisms. After recrystallization from ethanol/water the melting point is 260° (decomposition) after sintering around 216°.

EXAMPLE 3

2-Ethyl-8-Methyl-2.8-Diazaspiro(4.5)Decane-1.3-Dione

First, [(1-methyl-4-carbethoxy-piperidyl)-4]-acetic acid ethyl ester is produced in a manner analogous to that described in Example 1(A) and (B). 15.0 g. of the last mentioned material in 15 cc. of ethylamine are heated in a sealed tube to 150° for 40 hours. The excess of the amine is evaporated at the pump at 40° and the crystalline crude product is distilled in a high vacuum to recover 2-ethyl-8-methyl-2.8-diazaspiro(4.5)decane-1.3-dione which boils at 79° at 0.04 mm. of Hg.

The hydrochloride of the free base is obtained by adding to a solution of the base in ethanol a solution of ethanolic hydrochloric acid. After recrystallization from ethanol, the material is obtained in colorless prisms having a melting point of 255°.

The hydrobromide is obtained in similar manner and melts at 302–304° after recrystallization from ethanol.

In order to produce the fumarate a concentrated aqueous solution of fumaric acid is reacted with an equivalent amount of the free base (1 mol:1 mol). A small amount of ethanol is added and the colorless resulting solution is evaporated to dryness. The residue is crystallized from ethanol/water and provides colorless polyhedric crystals having a melting point of 204–206°.

In order to produce the picrate, an excess of ethanolic picric acid solution is added to free base and the resulting mixture is boiled for a short time. After cooling, filtering is effected and the material is recrystallized three times from ethanol/water; it has a melting point of 214–217°.

EXAMPLE 4

2-Methyl-2.8-Diazaspiro(4.5)Decane-1.3-Dione (A) (1-BENZYL-PIPERIDYLIDENE-4)-CYANACETIC ACID ETHYL ESTER 50.0 g. of cyanacetic acid ethyl ester, 70.48 g. of 1-benzyl-piperidone-4, 12 cc. of glacial acetic acid and 4 g. of ammonium acetate are boiled together with 400 cc. of benzene at refluxing temperature for 7 hours. The resulting water is removed continuously by means of a continuous water removing device; after 7 hours 7 cc. of water have been split off. After having cooled the reaction solution with ice water, the material is extracted once with saturated potassium carbonate solution and the aqueous phase is washed once with benzene. The united benzene layers are again washed with water, dried over sodium sulphate and evaporated. The dark colored residue, consisting of crude (1-benzylpiperidylidene-4)-cyanacetic acid ethyl ester, crystallizes completely on cooling. The ester may be used directly without further purification. On recrystallizing from ether/petroleum ether yellow colored crystals having a melting point of 70–71° are obtained.

(B) [(1-BENZYL-4-CARBETHOXY-PIPERIDYL)-4]-ACETIC ACID ETHYL ESTER

The above residue crude (1-benzyl-piperidylidene-4)- cyanacetic acid ethyl ester is dissolved in 500 cc. of ethanol, 250 cc. of water are added and the solution is heated on a boiling water bath. During the heating 31 g. of potassium cyanide are added which soon dissolves on shaking. After the crude and cyanide have dissolved, the material is kept for 12–15 minutes at 75°, then 250 cc. of 2 N hydrochloric acid solution are added and the solution is evaporated to dryness at the pump. Subsequently 750 cc. of concentrated hydrochloric acid solution are added and the material is boiled for 14 hours at reflux, cooling is effected and the product filtered. The filtrate is evaporated to dryness and the residue together with the material remaining on the filter is dried for 60 hours over phosphorus pentoxide. The dry crystalline mass is then dissolved in 500 cc. of absolute ethanol and hydrochloric acid gas is introduced while cooling with ice until saturation is reached. The resulting material is boiled for 18 hours at reflux, the reaction mixture is cooled and filtered off. The filtrate is again evaporated to dryness, the residues from the evaporation and the filtration are dissolved in ice water and an excess of potassium carbonate is added to the solution. Extraction is then effected three times with ether and the ether extracts are each washed with water once. The ether extracts dried over sodium sulphate are reduced in volume and the resulting oily residue is distilled. [(1-benzyl-4-carbethoxy-piperidyl)-4]-acetic acid ethyl ester boils at 150° at 0.03 mm. of Hg (temperature measured in an air bath); it consists of a slightly yellow colored oil.

(C) 2-METHYL-8-BENZYL-2.8-DIAZASPIRO-(4.5)-DECANE-1.3-DIONE 15.0 g. of the product produced as at (B) above are heated with an excess of liquid methylamine for 12 hours in a steel autoclave at 180°. Thereafter the excess of methylamine is allowed to evaporate and the crystalline residue is heated for a further 4 hours to 200° until the product which has melted at that temperature no longer forms bubbles. The substance is then taken up in a little ethanol, is boiled for a short time with a little activated charcoal and filtered. On cooling, 2-methyl-8-benzyl-2.8-diazaspiro-(4.5)decane)-1.3-dione precipitates in large colorless prisms having a melting point of 111–112°. The hydrochloride crystallizes from ethanol giving colorless prisms of a melting point of 254–256°.

(D) 2-METHYL-2.8-DIAZASPIRO(4.5)DECANE-1.3-DIONE 3.0 g. of 2-methyl-8-benzyl-2.8-diazaspiro(4.5)decane-1.3-dione produced at (C) above in 100 cc. of ethanol are hydrogenated with 300 mg. of palladium on activated charcoal (10%) during 12 hours at atmospheric pressure and room temperature. The amount of hydrogen taken up is 315 cc. (=114%). After evaporation of the ethanol, the resulting crude 2-methyl-2.8-diazaspiro(4.5)decane-1.3-dione is distilled in a high vacuum; it has a boiling point of 99° at 0.02 mm. of Hg (temperature measured in the air bath). It is very strongly hygroscopic and crystallizes in rectangular prisms having a melting point of 67°. The hydrobromide is present in the form of felted, fine needles having a melting point of 292–294° after recrystallization from ethanol/water.

EXAMPLE 5

*2.8-Diazaspiro(4.5)Decane-1.3-Dione*

(A) 8-BENZYL-2.8-DIAZASPIRO(4.5)DECANE-1.3-DIONE

Using the process as described in Example 4 at (A), (1-benzyl-piperidylidene-4)-cyanacetic acid ethyl ester is produced first. The last mentioned material is present in the form of yellow crystals having a melting point of 70–71° after crystallizing from ether/petroleum ether.

Incorporation of the elements of hydrocyanic acid is effected by treatment with an alkali metal cyanide as described in Example 4 at (B). Thereupon saponification with concentrated hydrochloric acid solution is effected for only three hours (no further carbon dioxide evolution can be detected). After cooling, filtering is effected, the filtrate is evaporated to dryness and the residue is dried thoroughly over phosphorus pentoxide. Esterification is effected by means of ethanol/hydrogen chloride at room temperature. The reaction mixture is evaporated to dryness, the residue is taken up in a little water, is made alkaline with potassium carbonate while cooling with ice and extracted with chloroform. The chloroform extract is concentrated, whereby the compound free from solvent crystallizes out. The material is [(1-benzyl-4-carbamoyl-piperidyl)-4]-acetic acid ethyl ester which is converted into the required 8-benzyl-2.8-diazaspiro(4.5)decane-1.3-dione by heating above the melting point. The melting point of the dione is 185° after crystallization from ethanol. The hydrochloride has a melting point of 312° (decomposition) after crystallization from ethanol.

(B) 2.8-DIAZASPIRO-(4.5)-DECANE-1.3-DIONE

The compound obtained as at (A) of this example is subjected to catalytic hydrogenation in order to split off the benzyl group by the method described in Example 4 at (D). 2.8-diazaspiro(4.5) decane-1,3-dione melts at 243–244° (decomposition) after recrystallization from ethanol. The hydrochloride has a melting point of 356° (decomposition) after recrystallization from ethanol/water.

EXAMPLE 6

*2.8-Diethyl-2.8-Diazaspiro(4.5)Decane-1.3-Dione*

2-ethyl-8-benzyl-2.8-diazaspiro(4.5)decane-1.3-dione is first produced from [(1-benzyl-4-carbethoxy-piperidyl)-4]-acetic acid ethyl ester and ethylamine by means of the process described in Example 4; the compound has a melting point of 104–105° after recrystallization from ethanol.

The splitting off of the benzyl group is effected in a manner analogous to that of the above example and leads to 2-ethyl-2.8-diazaspiro(4.5)decane-1.3-dione. The last mentioned material is present in the form of a very viscous oil having a boiling point of 107°/0.05 mm. of Hg. The said compound does not crystallize.

13 g. of the last mentioned compound, 25 cc. of freshly distilled acetaldehyde, 75 cc. of ethanol and 3 g. of Raney nickel are shaken in an atmosphere of hydrogen for 24 hours at atmospheric pressure and room temperature. The catalyst is filtered off, the solvent is evaporated and the residue is distilled at a reduced pressure. At 132° at 0.2 mm. of Hg there distills over a fraction consisting of 2.8-diethyl-2.8-diazaspiro(4.5)decane-1.3-dione. The hydrobromide of the last mentioned material melts at 293° after recrystallization from methanol.

EXAMPLE 7

*2-Ethyl-8-n-Butyl-2.8-Diazaspiro(4.5)Decane-1.3-Dione*

3.10 g. of the product produced in the second paragraph of Example 6 are heated to a boil at reflux with 2.17 g. of n-butyl bromide and 5 g. of sodium carbonate in 25 cc. of n-butanol for 24 hours. The reaction mixture is evaporated to dryness and the residue taken up in 2 N hydrochloric acid solution while cooling. The acid solution is extracted once with ether, made alkaline with potassium carbonate and extracted with ether. The hydrochloride of 2 - ethyl-8-n-butyl-2.8-diazaspiro(4.5)decane-1.3-dione is produced from the ether extract by adding a solution in ethanol of hydrogen chloride. Melting point 269° after recrystallization from ethanol.

Reference is now made to the following table wherein compounds are mentioned which have been produced by procedures similar to those described in the foregoing examples. The said table also gives the physical properties of the relevant compounds. In said table the compounds shown in Examples 8 to 10 inclusive were produced by a procedure similar to that of Examples 1 to 4, whereas the compounds shown as Examples 11 and 12 were produced by a procedure similar to that of Examples 5 to 7 inclusive.

| Name of compound | Fig. 1 R₁ | Fig. 1 R₂ | Free base, Boiling point/ mm. of Hg | Salt, melting point, form of crystal | Ex. No. |
|---|---|---|---|---|---|
| 2-isopropyl-8-methyl-2.8-diazaspiro (4.5)decane-1.3-dione | CH₃ | i—C₃H₇ | 88–92°/0.04 | Hydrobromide 251–253° colorless fine needles from ethanol. | 8 |
| 2-n-butyl-8-methyl-2.8-diazaspiro (4.5)decane-1.3-dione | CH₃ | n—C₄H₉ | 109–110°/0.04 | Hydrobromide 180–181° colorless scaly crystals from ethanol. | 9 |
| 2-isobutyl-8-methyl-2.8-diazaspiro (4.5)decane-1.3-dione | CH₃ | i—C₄H₉ | 114–117°/0.15 | Hydrobromide 240–242° crystals from ethanol. | 10 |
| 2-ethyl-8-isopropyl-2.8-diazaspiro(4.5) decane-1.3-dione | i—C₃H₇ | C₂H₅ | Not determined | Hydrobromide 277–278° crystals from ethanol/ether. | 11 |
| 2-propyl-8-methyl-2.8-diazaspiro(4.5) decane-1.3-dione | CH₃ | n—C₃H₇ | do | Hydrobromide 225° crystals from ethanol. | 12 |

REACTION SCHEME

Final Product 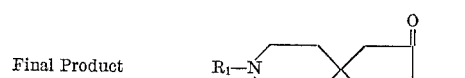 Fig. 1

Reactant A
Piperdone-4 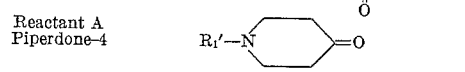 Fig. 2 and

Reactant B
Reactive Methylene Compound 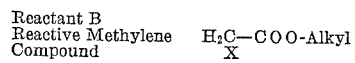 Fig. 3

↓

Piperylidene-4 Compound (Intermediate I) 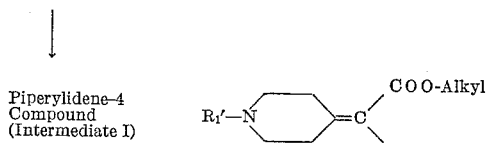 Fig. 4

↓

Hydrogen Cyanide Addition Compound of Piperylidene-4 Compound (Intermediate II) 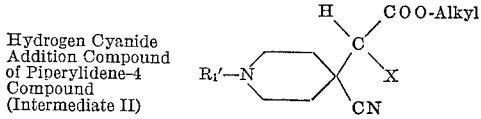 Fig. 5

↓

Substituted Succinic Acid Diester (Intermediate III) 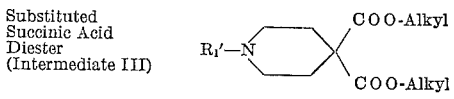 Fig. 6 and

Amine    R₂—NH₂    Fig. 7

↓              ↓

Final Product     Final Product (Fig. 1)

We claim:

1. A compound selected from the group consisting of succinimides having the formula

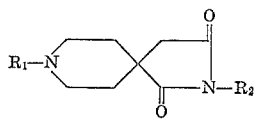

wherein R₁ is a member of the group consisting of hydrogen, lower alkyl and benzyl, and R₂ is a member of the group consisting of hydrogen and lower alkyl, and pharmacologically acceptable acid addition salts thereof.

2. 2.8 - dimethyl - 2.8 - diazaspiro(4.5)decane - 1.3-dione.

3. 2 - ethyl - 8 - methyl - 2.8 - diazaspiro(4.5)decane-1.3-dione.

4. 2 - methyl - 8 - benzyl - 2.8 - diazaspiro(4.5)decane-1.3-dione.

5. 2 - methyl - 2.8 - diazaspiro(4.5)decane - 1.3 - dione.

6. 8 - benzyl - 2.8 - diazaspiro(4.5)decane - 1.3 - dione.

7. 2.8-diazaspiro(4.5)decane-1.3-dione.

8. 2 - ethyl - 8 - benzyl - 2.8 - diazaspiro(4.5)decane-1.3-dione.

9. 2-ethyl-2.8-diazaspiro(4.5)decane-1.3-dione.

10. 2 - ethyl - 8 - n - butyl - 2.8 - diazaspiro(4.5)decane-1.3-dione.

11. 2 - ethyl - 8 - isopropyl - 2.8 - diazaspiro(4.5)decane-1.3-dione.

12. A process for the production of succinimides of the Formula I

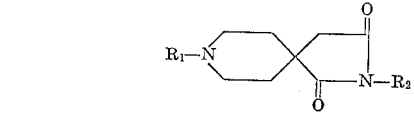

wherein R₁ is selected from the group consisting of lower alkyl and benzyl and R₂ is selected from the group consisting of hydrogen and lower alkyl, which comprises condensing at elevated temperature a succinic acid diester of the formula

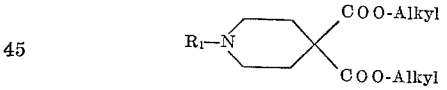

wherein R₁ has the above mentioned meaning, with a compound of the formula

R₂—NH₂ wherein R₂ has the above mentioned meaning and isolating said succinimide of Formula I.

13. A process according to claim 12 for the production of succinimides of the formula

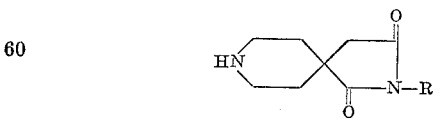

wherein R is selected from the group consisting of hydrogen and lower alkyl, which comprises condensing at elevated temperature a succinic acid diester of formula

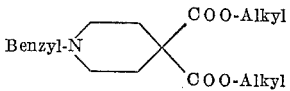

with a compound of the formula

R—NH₂ wherein R has the above mentioned meaning to obtain a compound of the formula
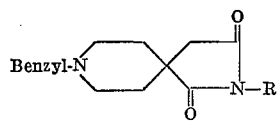
and splitting off the benzyl group from said last named compound by catalytic hydrogenation whereby said desired succinimide is recovered.
References Cited in the file of this patent
UNITED STATES PATENTS
2,978,454    Elpern _____ Apr. 4, 1961
FOREIGN PATENTS
592,016    Great Britain _____ Sept. 4, 1947

UNITED STATES PATENT OFFICE
CERTIFICATE OF CORRECTION

Patent No. 3,056,796                           October 2, 1962

Ernst Jucker et al.

It is hereby certified that error appears in the above numbered patent requiring correction and that the said Letters Patent should read as corrected below.

Column 2, lines 20 to 23, column 9, lines 46 to 49, and column 10, lines 43 to 46, the formula, each occurrence, should appear as shown below instead of as in the patent:

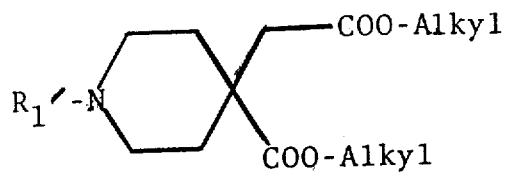

column 10, lines 67 to 71, the formula should appear as shown below instead of as in the patent:

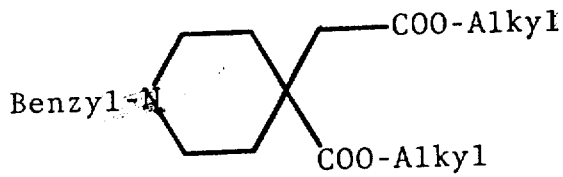

Signed and sealed this 28th day of September 1965.

(SEAL)
Attest:

ERNEST W. SWIDER
Attesting Officer

EDWARD J. BRENNER
Commissioner of Patents